United States Patent
Rong et al.

(10) Patent No.: US 10,812,219 B2
(45) Date of Patent: *Oct. 20, 2020

(54) SYSTEMS AND METHODS FOR ADAPTIVE DOWNLINK CONTROL INFORMATION SET FOR WIRELESS TRANSMISSIONS

(71) Applicant: Huawei Technologies Co., Ltd., Shenzhen (CN)

(72) Inventors: Lu Rong, Shanghai (CN); Kelvin Kar Kin Au, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/241,793

(22) Filed: Jan. 7, 2019

(65) Prior Publication Data

US 2019/0140769 A1    May 9, 2019

Related U.S. Application Data

(63) Continuation of application No. 15/077,657, filed on Mar. 22, 2016, now Pat. No. 10,193,656.

(Continued)

(51) Int. Cl.
*H04L 1/00* (2006.01)
*H04L 5/00* (2006.01)
*H04W 72/04* (2009.01)

(52) U.S. Cl.
CPC .......... *H04L 1/0038* (2013.01); *H04L 1/0046* (2013.01); *H04L 1/0052* (2013.01);
(Continued)

(58) Field of Classification Search
None
See application file for complete search history.

(56) References Cited

U.S. PATENT DOCUMENTS

2010/0302983 A1\* 12/2010 McBeath .............. H04L 5/0005
370/311
2011/0143796 A1    6/2011 Lee et al.
(Continued)

FOREIGN PATENT DOCUMENTS

CN        101932024 A    12/2010
CN        103188029 A    7/2013
(Continued)

OTHER PUBLICATIONS

"3rd Generation Partnership Project; Technical Specification Group Radio Access Network; Evolved Universal Terrestrial Radio Access (E-UTRA); Physical layer procedures (Release 12)" 3GPP TS 36.213 v12.7.0, Sep. 2015, 243 pages.
(Continued)

*Primary Examiner* — Yaotang Wang
(74) *Attorney, Agent, or Firm* — Slater Matsil, LLP

(57) ABSTRACT

It is possible to reduce the processing intensity of blind detection by configuring user equipments (UEs) to search for fewer than all possible DCI formats defined for a physical downlink control channel (PDCCH), as this reduces the number of searches performed by the corresponding UE during blind detection. The UE may select the subset of DCI formats to search for during blind detection based on various criteria, such as an air interface configuration assigned to the UE, a UE group to which the UE belongs, a transmission mode used by the UE, a re-transmission scheme assigned to the UE, a characteristic (e.g., size, location) of the UE's search space, or a combination thereof.

13 Claims, 6 Drawing Sheets

Related U.S. Application Data

(60) Provisional application No. 62/248,671, filed on Oct. 30, 2015.

(52) U.S. Cl.
 CPC ......... *H04L 5/0053* (2013.01); *H04W 72/042* (2013.01); *H04L 5/0091* (2013.01)

(56) References Cited

U.S. PATENT DOCUMENTS

| | | | | |
|---|---|---|---|---|
| 2014/0086184 | A1* | 3/2014 | Guan | H04W 72/1289 370/329 |
| 2014/0233470 | A1 | 8/2014 | Kim et al. | |
| 2016/0043849 | A1* | 2/2016 | Lee | H04W 72/042 370/329 |
| 2016/0205669 | A1* | 7/2016 | Kusashima | H04W 72/042 |

FOREIGN PATENT DOCUMENTS

| | | |
|---|---|---|
| WO | 2013099268 A1 | 7/2013 |
| WO | 2014165678 A2 | 10/2014 |
| WO | 2015061987 A1 | 5/2015 |

OTHER PUBLICATIONS

Motorola Mobility, "SCell Random Access Procedure", 3GPP TSG-RAN WG2#77, R2-120484, Feb. 6-10, 2012, Dresden, Germany, 4 pages.

Motorola, "PDCCH Search Space Assignment and Signaling," 3GPP TSG RAN1 #52 R1-080731, Feb. 11-15, 2008, Sorrento, Italy.

Samsung, "Signaling for Adapting TDD UL-DL Configurations," 3GPP TSG RAN WG1 #74bis R1-134154, Oct. 7-11, 2013, Guangzhou, China.

Samsung, "Signaling for Adapting TDD UL-DL Configurations," 3GPP TSG RAN WG1 #75 R1-135188, Nov. 11-15, 2013, San Francisco, USA.

* cited by examiner

SYSTEMS AND METHODS FOR ADAPTIVE DOWNLINK CONTROL INFORMATION SET FOR WIRELESS TRANSMISSIONS

This application is a continuation of U.S. patent application Ser. No. 15/077,657, filed on Mar. 22, 2016 and entitled "Systems and Methods for Adaptive Downlink Control Information Set for Wireless Transmissions," which claims priority to U.S. Provisional Application No. 62/248,671, filed on Oct. 30, 2015 and entitled "Systems and Methods for Adaptive Downlink Control Information Set for Wireless Transmissions," both of which applications are hereby incorporated by reference herein as if reproduced in their entireties.

TECHNICAL FIELD

The present invention relates to wireless communications, and, in particular embodiments, to systems and methods for adaptive downlink control information set for wireless transmissions.

BACKGROUND

Downlink control indicator (DCI) formats are communicated in a physical downlink control channel (PDCCH) to notify user equipments (UEs) of the physical downlink shared channel (PDSCH) resources they have been assigned. To reduce overhead, a UE may perform blind detection in a search space of the PDCCH to identify the DCI formats carrying resource assignments for the UE. Blind detection reduces control signaling overhead by allowing DCI formats to be received without communicating additional signaling to notify the UEs of the control channel elements (CCEs) carrying the DCI formats. Blind detection is processing intensive for the UEs. Accordingly, techniques for reducing the amount of processing resources used for blind detection are desired.

SUMMARY OF THE INVENTION

Technical advantages are generally achieved by embodiments of this disclosure which describe systems and methods for adaptive downlink control information set for wireless transmissions.

In accordance with an embodiment, a method for performing blind detection is provided. In this example, the method includes identifying a search space in a control channel that carries signaling according to at least some control formats in a set of control formats defined for the control channel, and determining a subset of control formats to search for in the search space based at least on an air interface configuration assigned to the UE. The subset of control formats excludes one or more control formats in the set of control formats defined for the channel. Different air interface configurations are associated with different subsets of control formats. The method further includes searching for the subset of control formats in the search space without searching for the one or more control formats excluded from the subset of control formats. An apparatus, as well as a computer program product, for performing the method are also provided.

BRIEF DESCRIPTION OF THE DRAWINGS

For a more complete understanding of the present invention, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
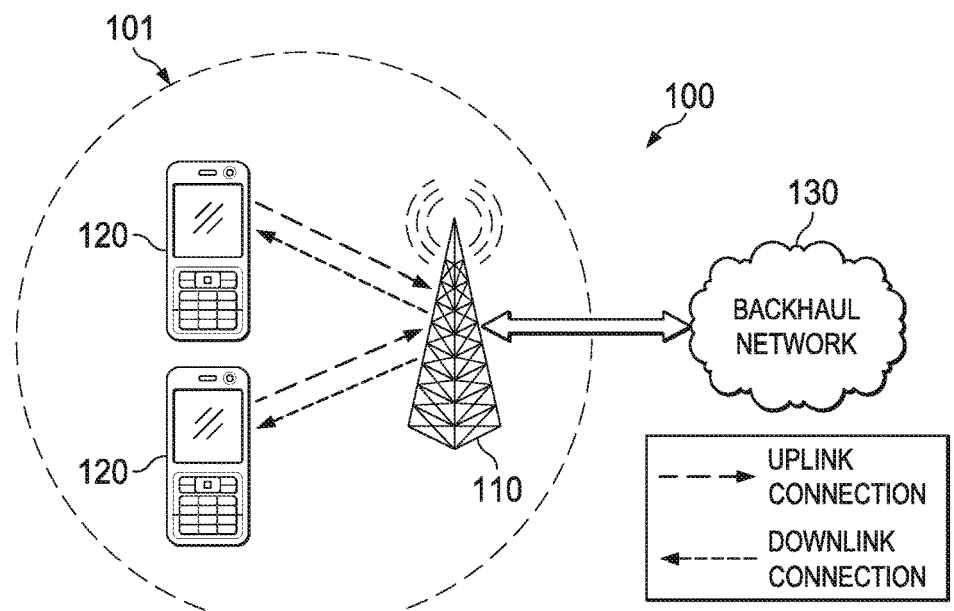
FIG. 1 is a diagram of an embodiment wireless network.

The making and using of embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. Although much of this disclosure discusses inventive aspects in the context of DCI formats in a PDCCH, it should be appreciated that those inventive aspects are applicable to blind decoding schemes that search for any type of control format in any type of control channel.

Different DCI formats are used to carry different types of control signaling. A set of DCI formats may generally be defined for a control channel such that the control channel carries signaling using one or more DCI formats in the set of DCI formats. Conventional blind detection techniques require the UE to search for each DCI format in the set of DCI formats defined for the channel, even though only a few of those DCI formats may be present in the search space. This may significantly increase the processing intensity of blind detection, particularly when large sets of DCI formats are defined for the control channel.

Aspects of this disclosure reduce the processing intensity of blind detection by configuring the UE to search for a subset of the DCI formats defined for the PDCCH, thereby reducing the number of searches performed during blind detection. The UE may determine the subset of DCI formats to search for based on various criteria. In an embodiment, the UE determines the subset of DCI formats intuitively without receiving explicit control signaling from the network. In one example, different groups of UEs are associated with different subsets of DCI formats, and the UE determines the subset of DCI formats based on the UE group to which the UE belongs. In another example, different transmission modes and/or re-transmission schemes are associated with different subsets of DCI formats, and the UE determines the subset of DCI formats based on a transmission mode and/or re-transmission mode assigned to the UE by the network. In yet another example, the UE determines the subset of DCI formats based on a characteristic (e.g., size, location) of a search space assigned to the UE.

In yet another example, different air interface configurations are associated with different subsets of DCI formats, and the UE determines the subset of DCI formats based on an air interface configuration assigned by the network. As used herein, the term air interface configuration collectively refers to the set of parameters used to communicate a signal over an air interface, which may include a subset of physical layer parameters (e.g., sub-carrier spacing, transmission time interval (TTI), cyclic prefix (CP) length) used to communicate the signal over the air interface, a waveform used to communicate the signal over the air interface, an access scheme used to access resources over which the signal is transmitted, a re-transmission scheme used to verify that the signal communicated over the air interface was successfully received, or a combination thereof. Different transmission modes may be used to transmit over a given air interface configuration. These and other inventive aspects are described in greater detail below.

FIG. 1 is a diagram of a wireless network 100 for communicating data. The wireless network 100 includes a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an evolved NodeB (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac. As used herein, the term "mobile device" refers to any component (or collection of components) capable of establishing a wireless connection with a base station. The terms "mobile device," "user equipment (UE)," and "mobile station (STA)" are used interchangeably throughout this disclosure. In some embodiments, the network 100 may comprise various other wireless devices, such as relays. The term wireless device refers to any device that accesses, or facilitates access to, a wireless network, such as a mobile device, relay station, or smart device. The term network device refers to any device that provides, facilitates, or controls access to a wireless network, such as a base station, scheduler, or central controller. In some embodiments, a network device communicates directly with a wireless device. In other embodiments, a network device communicates indirectly with a wireless device, as may occur when a scheduler or central controller communicates with a mobile station via an intermediate base station.

Figure 2:
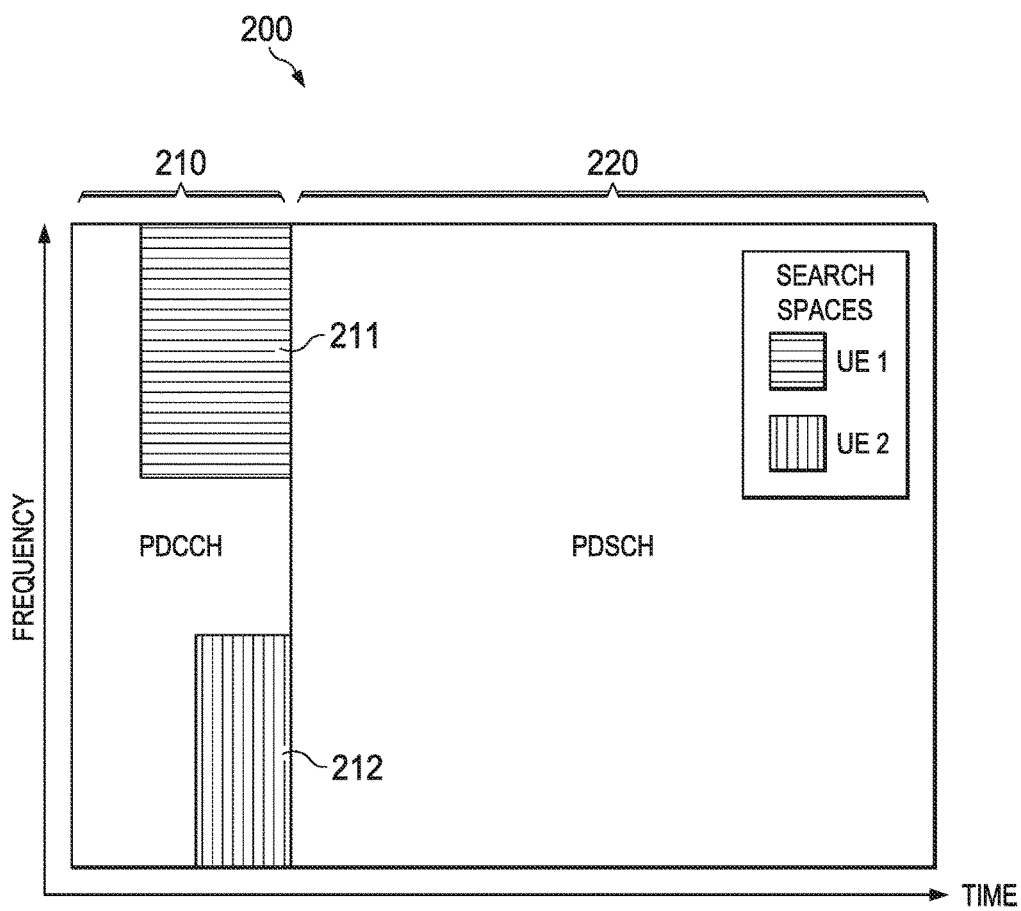
FIG. 2 is a diagram of a downlink frame.

Blind detection can be used to identify DCI formats in a physical downlink control channel (PDCCH). FIG. 2 illustrates a frame structure of downlink frame 200. As shown, the downlink frame 200 includes a PDCCH 210 and a physical downlink shared channel (PDSCH) 220. The downlink frame 200 may include additional channels that are not depicted in FIG. 2, such as an enhanced downlink control channel (ePDCCH). Two UEs, namely UE1 and UE2, perform blind decoding in respective search spaces 211, 212 of the PDCCH 210 in order to search for DCI formats that include an identifier (ID) assigned to the UE. The ID assigned to the UE may be a Radio Network Temporary ID (RNTI). The DCI formats specify which resources in the PDSCH 220 are assigned to the UEs. The DCI formats may specify other control signaling as well, such as uplink resource assignments and signaling parameters.

Figure 3:
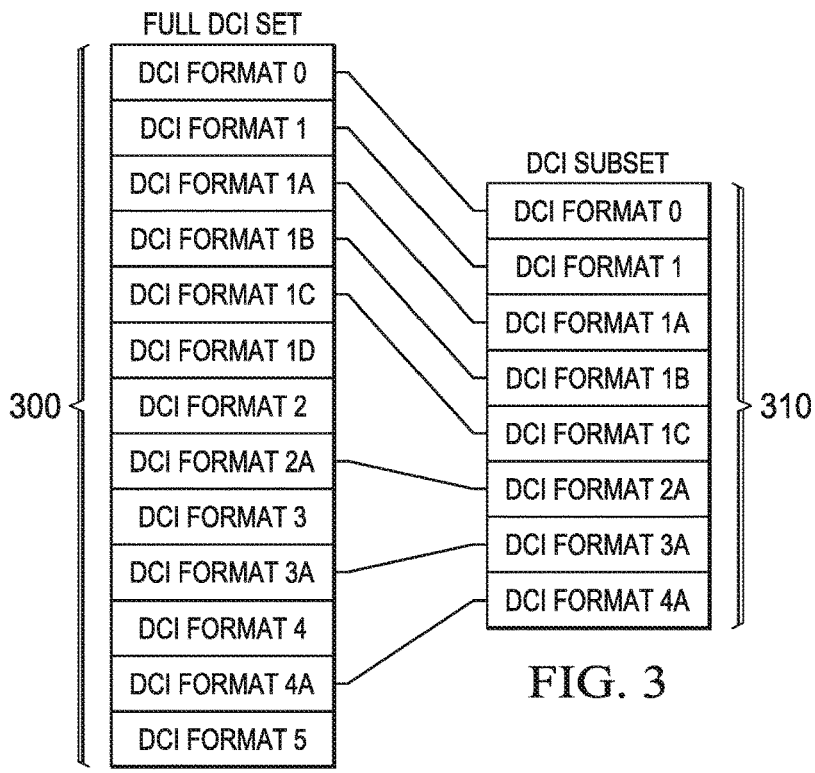
FIG. 3 is a diagram of a subset of DCI formats.

Embodiments provided herein configure UEs to search for a subset of DCI formats carried in a PDCCH in order to reduce the processing intensity of blind detection. FIG. 3 is a diagram showing a full set of DCI formats 300 and a subset of DCI formats 310. As shown, the full set of DCI formats 300 includes DCI format 0, DCI format 1, DCI formats 1A-1D, DCI format 2, DCI format 2A, DCI format 3, DCI format 3A, DCI format 4, DCI format 4A, and DCI format 5. Comparatively, the subset of DCI formats 310 includes DCI format 0, DCI format 1, DCI formats 1A-1C, DCI format 2A, DCI format 3A, and DCI format 4A. Hence, DCI format 1D, DCI format 2, DCI format 3, DCI format 4, and DCI format 5 are excluded from the subset of DCI formats 310.

It should be appreciated that some of the DCI formats 0-5 may carry different information, and have different lengths. In an embodiment, a UE searches for the subset of DCI formats 310 without searching for DCI formats that are excluded from the subset of DCI formats 310. The UE may identify the subset of DCI formats 310 based on various criteria, such as an air interface configuration assigned to the UE, a UE group to which the UE belongs, a transmission mode assigned to the UE, a location of the search space 211 assigned to the UE, and/or a size of the search space 211 assigned to the UE.

Figure 4:
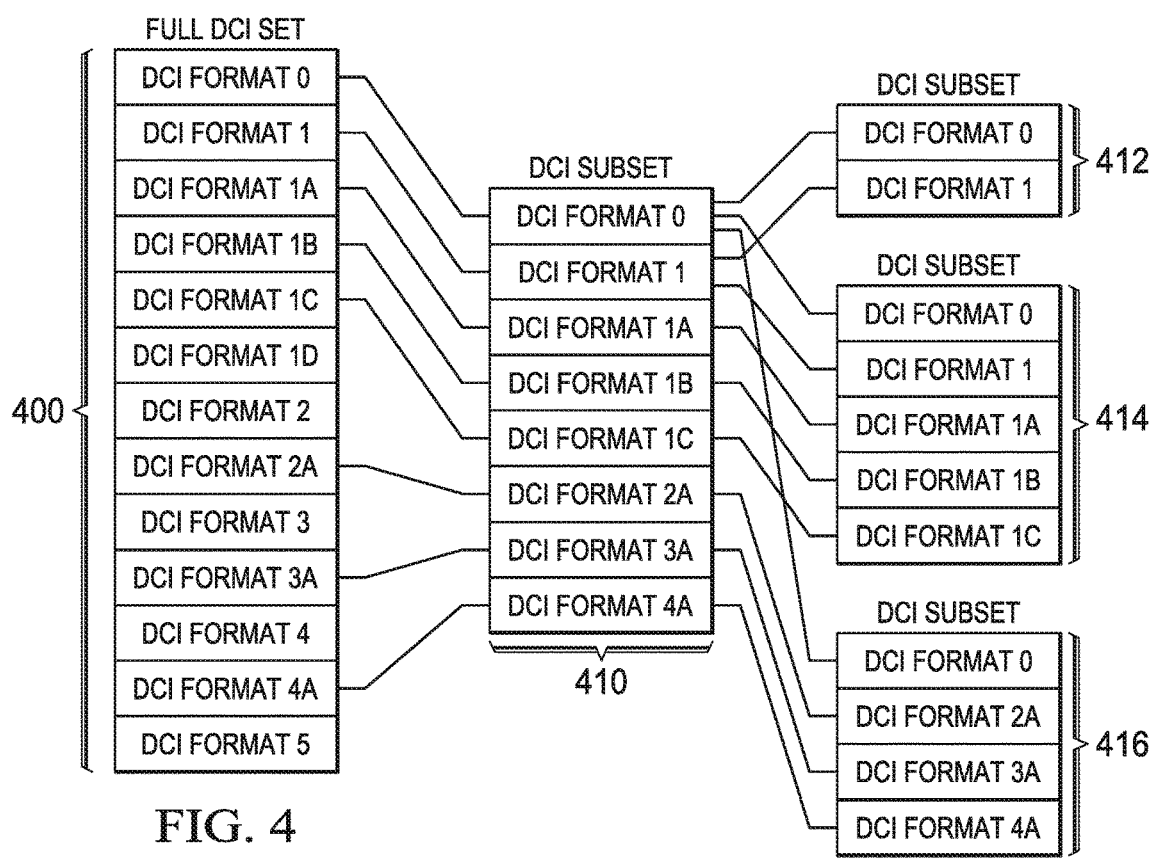
FIG. 4 is a diagram of multiple subset of DCI formats.

In some embodiments, there are multiple tiers of DCI subsets. FIG. 4 is a diagram showing a full set of DCI formats 400 and multiple subsets of DCI formats 410-416. The full set of DCI formats 400 includes the same DCI formats as the full set of DCI formats 300, and the subset of DCI formats 410 includes the same DCI formats as the subset of DCI formats 310. Accordingly, DCI format 1D, DCI format 2, DCI format 3, DCI format 4, and DCI format 5 are excluded from the subset of DCI formats 410.

Each of the subsets of DCI formats 412, 414, 416 is a further subset of the subset of DCI formats 410, and includes fewer than all DCI formats in the subset of DCI formats 410. As shown, the subset of DCI formats 412 includes DCI format 0 and DCI format 1. The subset of DCI formats 414 includes DCI format 0, DCI format 1, and DCI formats 1A-1C. The subset of DCI formats 416 includes DCI format 0, DCI format 2A, DCI format 3A, and DCI format 4A.

Figure 5:
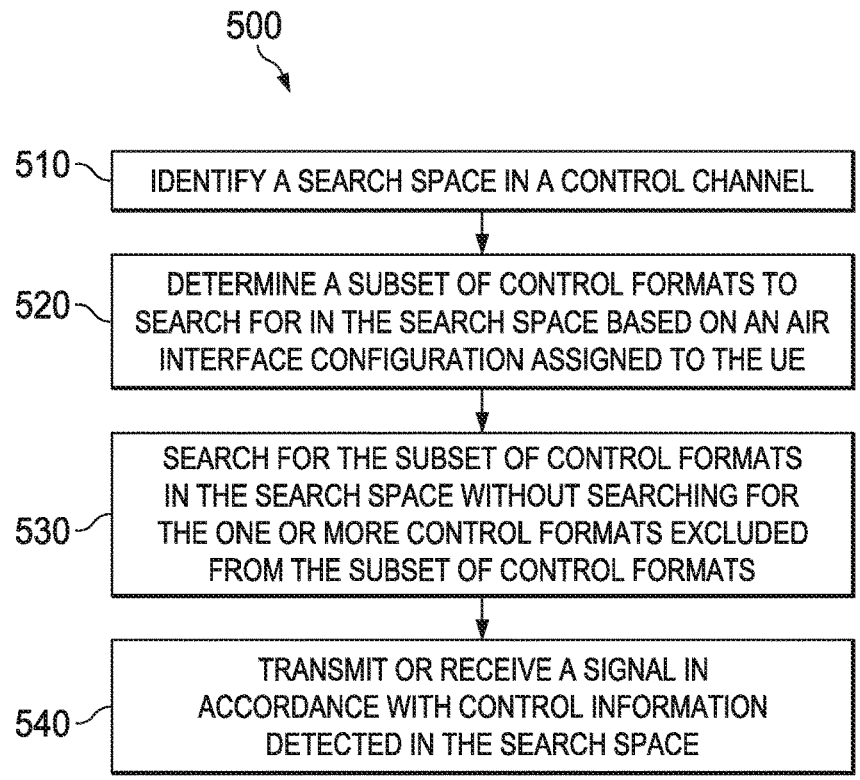
FIG. 5 is a flowchart of an embodiment method for performing blind decoding.

A UE may select a subset of control formats based on an air interface configuration assigned to the UE. FIG. 5 is a flowchart of an embodiment method 500 for performing blind detection, as may be performed by a UE. At step 510, the UE identifies a search space in a control channel. The search space may be a common search space, a cell-specific search space, or a UE-specific search space. Techniques for identifying a search space are discussed in Third Generation Partnership Project (3GPP) Technical Standard 36.213 (rel-12), which is incorporated by reference herein as if reproduced in its entirety. At step 520, the UE determines a subset of control formats to search for in the search space based on an air interface configuration assigned to the UE. In some embodiments, the UE determines the subset of control formats to search for in the search space based on a combination of the air interface configuration assigned to the UE and another parameter/factor, e.g., a UE group, transmission mode, re-transmission mode, search space characteristic, etc. The UE may intuitively determine the subset of control formats to search for in the search space without receiving explicit control signaling that specifies the subset of control formats. In one example, associations between subsets of control formats and criteria for making the determination are a priori information to the UE. In that example, the UE may store a table that associates subsets of DCI formats with one, or a combination of, air interface configurations, transmission modes, re-transmission schemes, or search space characteristics (e.g., size, location). At step 530, the UE searches for the subset of control formats in the search space without searching for the one or more control formats excluded from the subset of control formats. At step 540, the UE transmits or receives a signal in accordance with control information detected in the search space.

Figure 6:
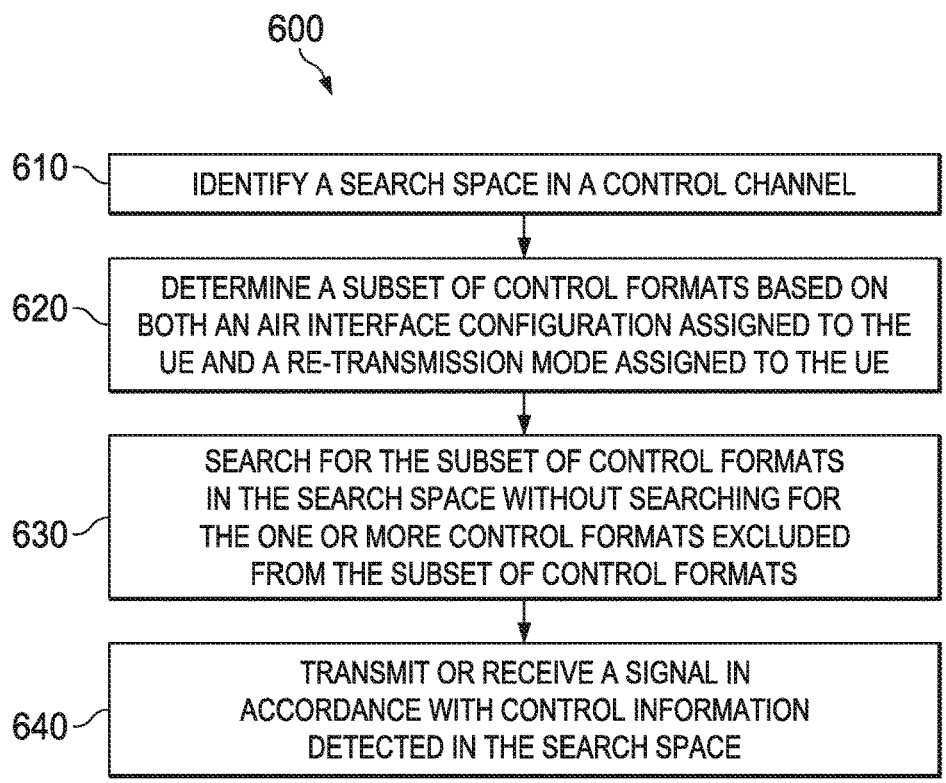
FIG. 6 is a flowchart of another embodiment method for performing blind decoding.

Other factors may be considered in conjunction with the assigned air interface configuration when selecting a subset of control formats to search for during blind detection. In one example, the subset of control formats is selected based on a combination of the air interface configuration and a re-transmission mode of the UE. In such an example, UEs that are assigned similar air interface configurations, but use re-transmission modes, may search for different control formats in their respective search spaces. FIG. 6 is a flowchart of another embodiment method 600 for performing blind detection, as may be performed by a UE. At step 610, the UE identifies a search space in a control channel. At step 620, the UE determines a subset of control formats to search for in the search space based on both an air interface configuration assigned to the UE and a retransmission assigned to the UE. Different types and/or numbers of control parameters may be configured for different re-transmission modes. At step 630, the UE searches for the subset of control formats in the search space without searching for the one or more control formats excluded from the subset of control formats. At step 640, the UE transmits or receives a signal in accordance with control information detected in the search space.

Figure 7:
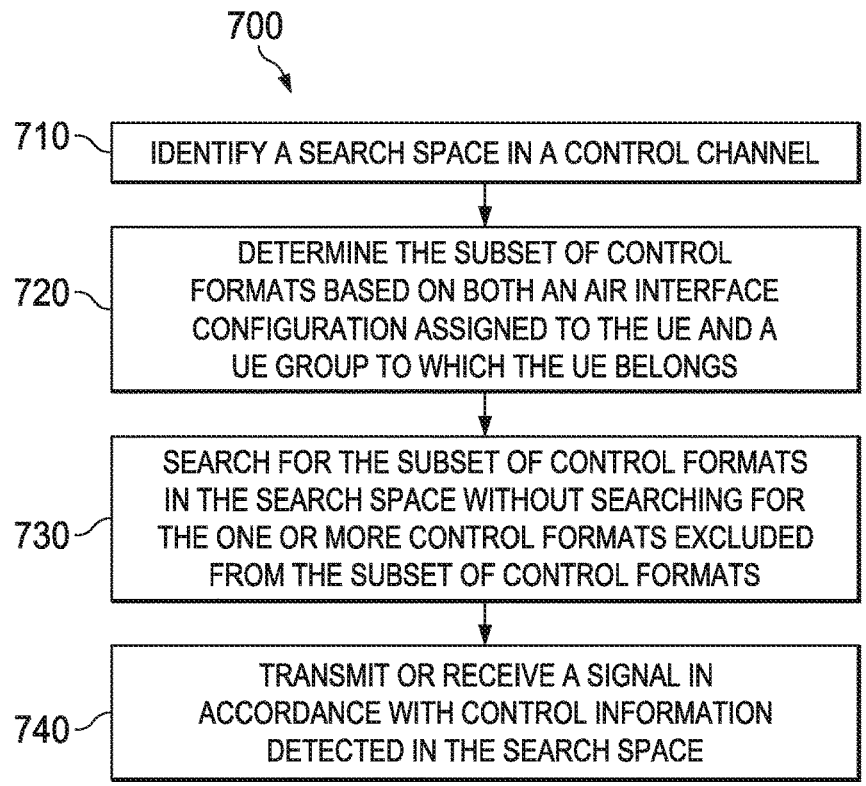
FIG. 7 is a flowchart of yet another embodiment method for performing blind decoding.

In another example, the subset of control formats is selected based on a combination of the assigned air interface configuration and a UE group to which the UE belongs. In such an example, UEs that are assigned similar air interface configurations, but belong to different UE groups, may search for different control formats in their respective search spaces. Likewise, UEs that belong to the same UE group, but are assigned different air interface configurations, may search for different control formats in their respective search spaces. FIG. 7 is a flowchart of yet another embodiment method 700 for performing blind detection, as may be performed by a UE. At step 710, the UE identifies a search space in a control channel. At step 720, the UE determines a subset of control formats to search for in the search space based on a combination of an air interface configuration assigned to the UE and a UE group to which the UE belongs. The group to which the UE belongs may be based on an equipment manufacturer of the UE, capabilities of the UE, a characteristic of the UE, a classification of the UE (e.g., legacy, next-generation, 4G, 5G, etc.), and/or a subscription level of the UE. At step 730, the UE searches for the subset of control formats in the search space without searching for the one or more control formats excluded from the subset of control formats. At step 740, the UE transmits or receives a signal in accordance with control information detected in the search space.

Figure 8:
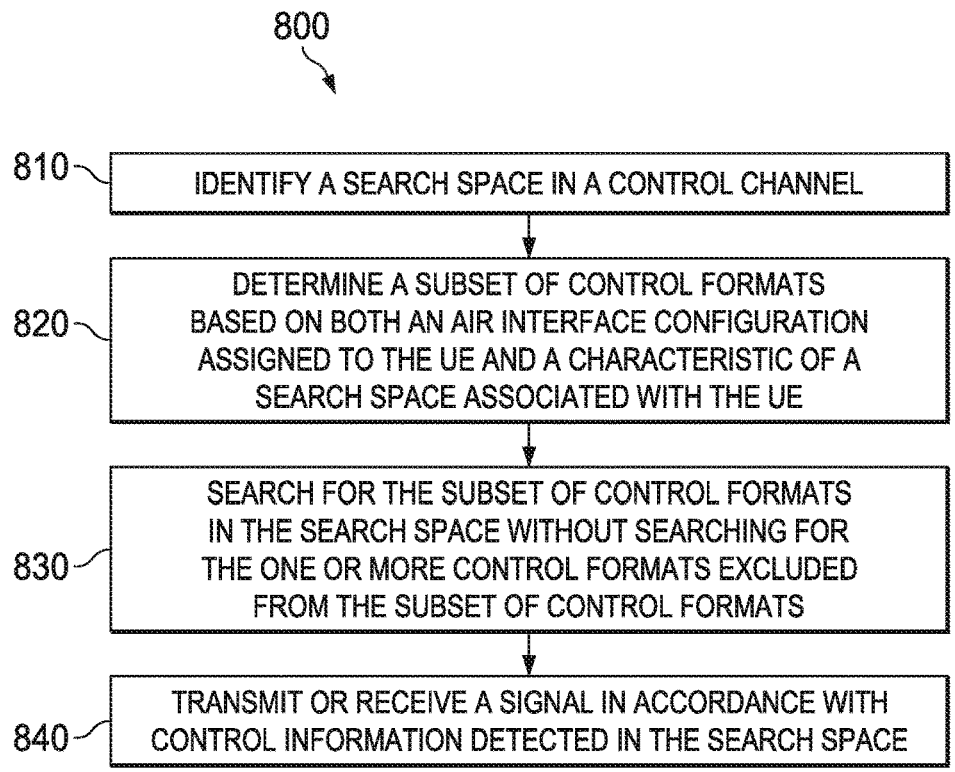
FIG. 8 is a flowchart of yet another embodiment method for performing blind decoding.

In yet another example, the subset of control formats is selected based on a combination of the assigned air interface configuration and a characteristic of the UE's search space. FIG. 8 is a flowchart of yet another embodiment method 800 for performing blind detection, as may be performed by a UE. At step 810, the UE identifies a search space in a control channel. At step 820, the UE determines a subset of control formats to search for in the search space based on a combination of an air interface configuration assigned to the UE and a characteristic of the UE's search space. The characteristic of the UE's search space may be a size, location, or aggregation level of the UE's search space. For example, UEs having larger search spaces may search for greater numbers of DCI formats and/or longer DCI formats. As another example, if a given DCI format is longer than the width and/or height of the UE's search space, then it may be excluded from the subset of DCI formats for which the UE searches when performing blind detection. At step 830, the UE searches for the subset of control formats in the search space without searching for the one or more control formats excluded from the subset of control formats. At step 840, the UE transmits or receives a signal in accordance with control information detected in the search space.

Figure 9:
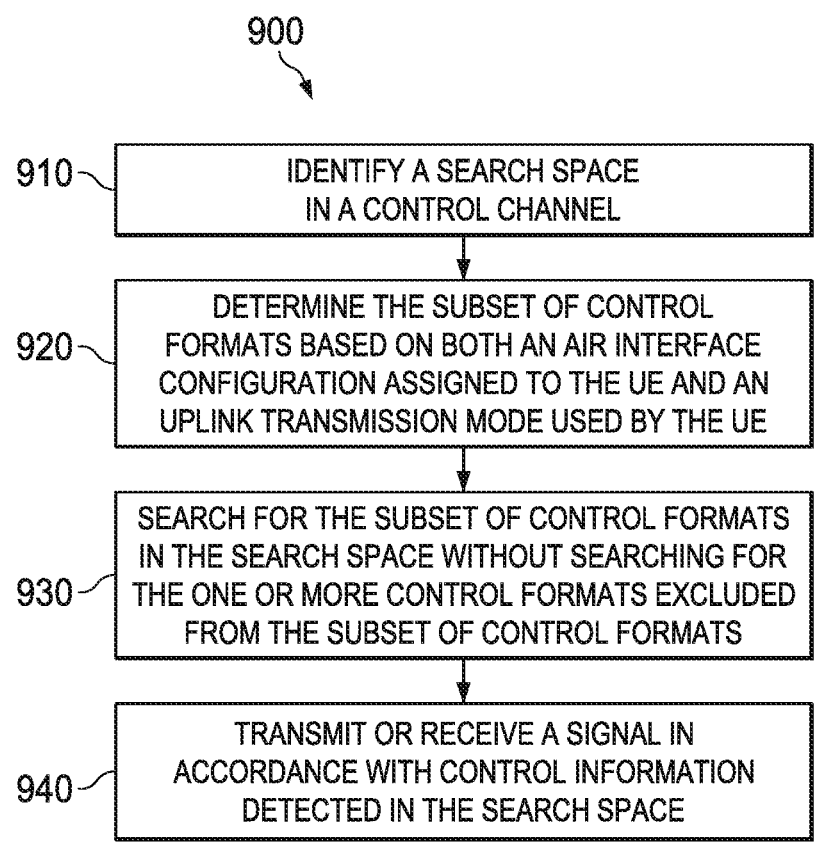
FIG. 9 is a flowchart of yet another embodiment method for performing blind decoding.

In yet another example, the subset of control formats is selected based on a combination of the assigned air interface configuration and an uplink transmission mode used by the UE. In such an example, UEs that are assigned the same air interface configuration, but that use different transmission modes, may search for different control formats in their respective search spaces. FIG. 9 is a flowchart of another embodiment method 900 for performing blind detection, as may be performed by a UE. At step 910, the UE identifies a search space in a control channel. At step 920, the UE determines a subset of control formats to search for in the search space based on both an air interface configuration assigned to the UE and a transmission mode used by the UE. Different uplink transmission modes may use different control signaling to configure transmission parameters. For example, more transmission parameters may need to be configured for transmission modes that use multiple transmission ports (e.g., multiple layers of spatial multiplexing) than for transmission modes that use a single antenna port transmission. As a result, multi-antenna port transmission modes may require larger DCI formats than single-antenna port transmission modes. At step 930, the UE searches for the subset of control formats in the search space without searching for the one or more control formats excluded from the subset of control formats. At step 940, the UE transmits or receives a signal in accordance with control information detected in the search space.

Figure 10:
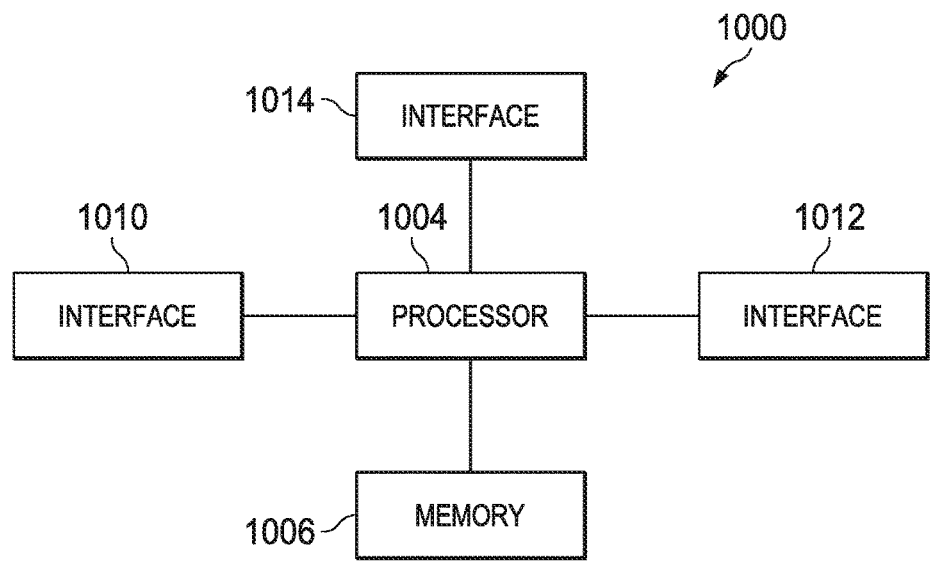
FIG. 10 is a diagram of an embodiment processing system.

FIG. 10 is a block diagram of an embodiment processing system 1000 for performing methods described herein, which may be installed in a host device. As shown, the processing system 1000 includes a processor 1004, a memory 1006, and interfaces 1010-1014, which may (or may not) be arranged as shown in FIG. 10. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, 1014 may be any component or collection of components that allow the processing system 1000 to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in FIG. 10, such as long term storage (e.g., non-volatile memory, etc.).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
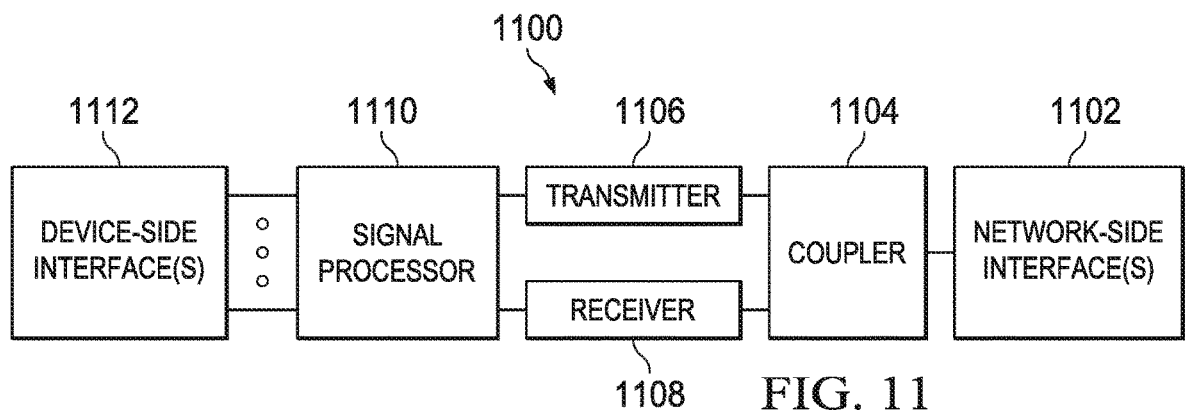
FIG. 11 is a diagram of an embodiment transceiver.

In some embodiments, one or more of the interfaces 1010, 1012, 1014 connects the processing system 1000 to a transceiver adapted to transmit and receive signaling over the telecommunications network. FIG. 11 is a block diagram of a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1000, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an identifying unit/module and/or a determining unit/module. The respective units/modules may be hardware, software, or a combination thereof. For instance, one or more of the units/modules may be an integrated circuit, such as field programmable gate arrays (FPGAs) or application-specific integrated circuits (ASICs).

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for performing blind detection, the method comprising:
   receiving, by a user equipment (UE), a configuration assigned to the UE, the configuration comprising a physical layer parameter for communicating over an air interface, the physical layer parameter indicating a sub-carrier spacing;
   determining a candidate subset of control formats from a plurality of subsets of control formats based on a combination of the sub-carrier spacing and a size of a search space located in a control channel, each of the plurality of subset of control formats belonging to a set of control formats of different lengths defined for control signaling in the control channel, a control format longer than the size of the search space being excluded from the candidate subset of control formats, wherein the plurality of subset of control formats are arranged in multiple tiers and include at least a first subset of control formats in a higher tier and a second subset of control formats in a lower tier, and wherein the second subset of control formats is a further subset of the first subset of control formats;
   searching in the search space, by the UE, for the control signaling using the candidate subset of control formats; and
   transmitting or receiving, by the UE, a data signal in accordance with the control signaling.

2. The method of claim 1, wherein the candidate subset of control formats are determined further based on both the configuration and an uplink transmission mode used by the UE, wherein UEs assigned the same configuration, but different uplink transmission modes, search for different subsets of control formats.

3. The method of claim 1, wherein the candidate subset of control formats are determined further based on both the configuration and a UE group to which the UE belongs, wherein UEs assigned the same configuration, but belonging to different UE groups, search for different subsets of control formats.

4. The method of claim 1, wherein the candidate subset of control formats is assigned to a location of the search space in the control channel, wherein search spaces positioned at difference locations in the control channel are associated with different subsets of control formats.

5. The method of claim 1, wherein the candidate subset of control formats are determined further based on both the configuration and a re-transmission mode assigned to the UE, wherein UEs assigned the same configuration, but different re-transmission modes, search for with different subsets of control formats.

6. A user equipment (UE) comprising:
a processor; and
a computer readable storage medium storing programming for execution by the processor, the programming including instructions to:
receive a configuration assigned to the UE, the configuration comprising a physical layer parameter for communicating over an air interface, the physical layer parameter indicating a sub-carrier spacing;
determine a candidate subset of control formats from a plurality of subsets of control formats based on a combination of the sub-carrier spacing and a size of a search space located in a control channel, each of the plurality of subset of control formats belonging to a set of control formats of different lengths defined for control signaling in the control channel, a control format longer than the size of the search space being excluded from the candidate subset of control formats, wherein the plurality of subset of control formats are arranged in multiple tiers and include at least a first subset of control formats in a higher tier and a second subset of control formats in a lower tier, and wherein the second subset of control formats is a further subset of the first subset of control formats;
search in the search space for the control signaling using the candidate subset of control formats; and
transmit or receive a data signal in accordance with the control signaling.

7. The UE of claim 6, wherein the candidate subset of control formats are determined further based on both the configuration and a transmission mode used by the UE, wherein UEs assigned the same configuration, but different transmission modes, search for different subsets of control formats.

8. The UE of claim 6, wherein the candidate subset of control formats are determined further based on both the configuration and a UE group to which the UE belongs, wherein UEs assigned the same configuration, but belonging to different UE groups, search for different subsets of control formats.

9. The UE of claim 6, wherein the candidate subset of control formats is assigned to a location of the search space in the control channel, wherein search spaces positioned at difference locations in the control channel are associated with different subsets of control formats.

10. The UE of claim 6, wherein the candidate subset of control formats are determined further based on both the configuration and a re-transmission mode assigned to the UE, wherein UEs assigned the same configuration, but different re-transmission modes, search for with different subsets of control formats.

11. The UE of claim 6, wherein the control channel is a physical downlink control channel (PDCCH), and wherein the candidate subset of control formats are downlink control information (DCI) formats defined for the PDCCH.

12. A computer program product comprising a non-transitory computer readable storage medium storing programming to be executed by processor(s) of a user equipment (UE), the programming including instructions to:
receive a configuration assigned to the UE, the configuration comprising a physical layer parameter for communicating over an air interface, the physical layer parameter indicating a sub-carrier spacing;
determine a candidate subset of control formats from a plurality of subsets of control formats based on a combination of the sub-carrier spacing and a size of a search space located in a control channel, each of the plurality of subset of control formats belonging to a set of control formats of different lengths defined for control signaling in the control channel, a control format longer than the size of the search space being excluded from the candidate subset of control formats, wherein the plurality of subset of control formats are arranged in multiple tiers and include at least a first subset of control formats in a higher tier and a second subset of control formats in a lower tier, and wherein the second subset of control formats is a further subset of the first subset of control formats;
search in the search space for the control signaling using the candidate subset of control formats; and
transmit or receive a data signal in accordance with the control signaling.

13. The computer program product of claim 12, wherein the candidate subset of control formats are determined further based on both the configuration and a multiple antenna transmission mode used by the UE, wherein UEs assigned the same configuration, but in different multiple antenna transmission modes, search for different subsets of control formats.

* * * * *